United States Patent [19]

Otteman

[11] Patent Number: 5,007,328
[45] Date of Patent: Apr. 16, 1991

[54] LINEAR ACTUATOR

[76] Inventor: John H. Otteman, 4005 Hecker Pass Hwy., Gilroy, Calif. 95020

[21] Appl. No.: 384,715

[22] Filed: Jul. 24, 1989

[51] Int. Cl.⁵ .............................................. F01B 7/00
[52] U.S. Cl. ...................................... 92/63; 92/130 R; 92/165 R; 92/151; 251/63.5
[58] Field of Search ...................... 92/61, 62, 63, 69 R, 92/129, 130 R, 132, 150, 151, 152, 166; 251/63.4, 63.5

[56] References Cited

U.S. PATENT DOCUMENTS

| | | | |
|---|---|---|---|
| 3,430,539 | 3/1969 | Freeman | 92/151 |
| 3,752,040 | 8/1973 | Pawloski et al. | 92/151 |
| 3,880,051 | 4/1975 | Eppler | 92/151 |
| 4,525,183 | 6/1985 | Cordes et al. | 251/63.5 |
| 4,585,207 | 4/1986 | Shelton | 92/62 |
| 4,776,562 | 10/1988 | Kalaskie et al. | 92/152 |
| 4,828,219 | 5/1989 | Ohmi et al. | 251/63.5 |
| 4,840,347 | 6/1989 | Ariizumi et al. | 251/63.4 |

FOREIGN PATENT DOCUMENTS

| | | | |
|---|---|---|---|
| 1235093 | 2/1967 | Fed. Rep. of Germany | 251/63.5 |
| 2252532 | 5/1974 | Fed. Rep. of Germany | 251/63.5 |

Primary Examiner—Edward K. Look
Assistant Examiner—Thomas Denion
Attorney, Agent, or Firm—Donald D. Mon

[57] ABSTRACT

A linear actuator with a pair of in-line piston-cylinder combinations, separated by a partition. The combinations are supplied from a common source of fluid under pressure through a single inlet port. A guide pin prevents the uppermost piston from cooking, and serves as an upper limit stop. The pistons are biased into abutment with one another.

1 Claim, 1 Drawing Sheet

U.S. Patent
Apr. 16, 1991
5,007,328
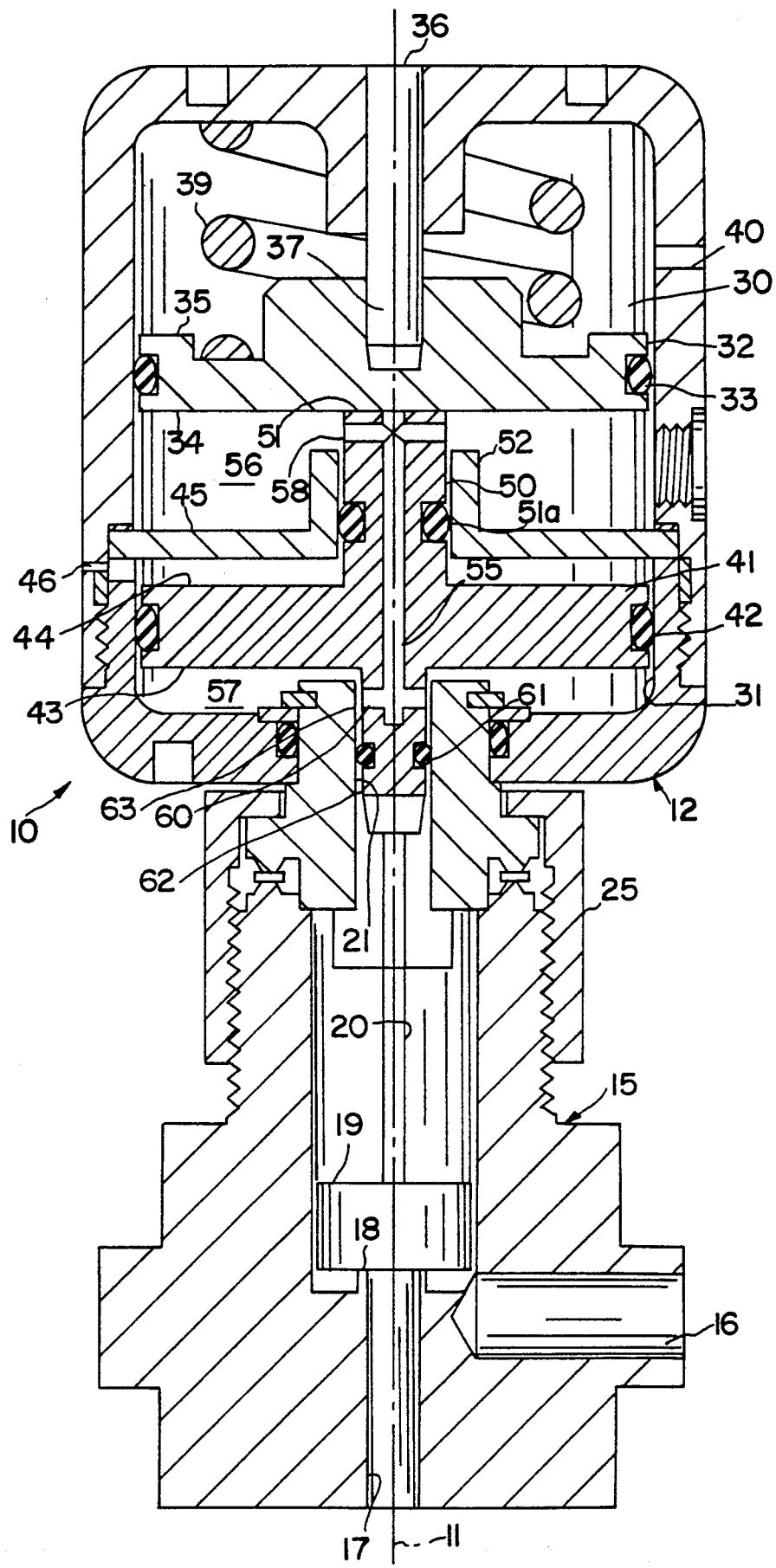

5,007,328

LINEAR ACTUATOR

FIELD OF THE INVENTION

This invention relates to a fluid pressure-powered linear actuator which exerts a force along an axis, usually to change the flow condition of a valve.

BACKGROUND OF THE INVENTION

Fluid pressure-powered linear actuators are widely used. They uniformly use some element such as a diaphragm or piston, some part of which moves along a linear axis. It is connected to a valving element. When the pressure changes, the element moves and changes the setting of the valve or whatever else is being controlled or set. Also, conventionally there is a bias spring which biases the element in one direction or the other, and the fluid pressure overcomes this bias in order to move the element. This invention belongs to this art, but provides substantial advantages in reduction of cost, complexity, and envelope size, together with simpler seal arrangements and improved reliability and, greater exerted force generated by a given differential pressure on an element of a given area.

Brief Description of the Invention

A linear actuator according to this invention includes a first spring-biased piston having one of its faces vented to atmosphere, and the other of its faces exposed to actuating pressure. It further includes a second piston abutted by, but not rigidly connected to, said first piston so as to share the spring bias of the first piston. One of its faces is vented to atmosphere. The other of its faces is exposed to actuating pressure.

Connector means is provided connecting the second piston to an element such as a valve which is to be controlled by linear movement of the second piston.

According to a preferred feature of the invention, the pistons are co-linear, and a partition is placed between the two pistons to enable one face of the second piston to be vented. Actuating pressure is supplied to the opposite sides of the pistons.

According to yet another preferred but optional feature of the invention, by-pass conduitry by-passes the partition so as simultaneously to provide actuation pressure to both pistons, from a single inlet port.

The above and other features of this invention will be fully understood from the following detailed description and the accompanying drawings, in which:

BRIEF DESCRIPTION OF THE DRAWING

The single FIGURE is an axial-cross section of the presently-preferred embodiment of the invention.

DETAILED DESCRIPTION OF THE INVENTION

A fluid-pressure powered linear actuator 10 according to the invention is shown in FIG. 1. It has an actuation axis 11. A body 12 encloses the workings of this actuator. The function of the actuator is to control the position or condition of some next assembly such as a normally-closed or normally-open valve 15 which is schematically shown with an inlet 16, outlet 17, valve seat 18, and valve plug 19. The actuator is shown in its lowermost position, and the valve in its normally closed position. A link 20 connects the valve plug to the end of a shaft 21 on the actuator so that when the actuator is energized, the shaft rises and the valve opens. Thus there is shown a normally-closed-to-flow system. Of course normally open valves could as well be used, different types of valves could be provided, and actuated user devices other than valves could instead be controlled. Electrical switches provide another example.

A coupler 25 joins the valve to body 12 of the actuator.

Actuator body 12 has a first cylinder wall 30 and a second cylinder wall 31. These are circularly cylindrical, and are concentric on actuator axis 11.

A first piston 32 is slidingly fitted in the first cylinder wall. A peripheral sliding seal 33 fluidly isolates a first face 34 from a second face 35 of the first piston. A piston guide 36 extends axially into a central recess 37 in the first piston. It acts as a limit stop for upward movement, and as an alignment guide to restrain the piston from tilting.

A bias spring 39 is opposed between the body and the second face to apply a bias force to the first piston, pressing it downwardly in the FIG. A vent port 40 to atmosphere vents the first face of the first piston to atmosphere.

A second piston 41 is fitted in second cylindrical wall 31. A peripheral sliding seal 42 isolates the first face 43 of the second piston from its second face 44.

A fluid tight partition 45 extends across the inside of the body and separates the two cylinder walls from each other.

A vent port 46 vents the second face of the second piston to atmosphere. It will now be noted that the second (upper) faces of the two pistons are both vented to atmospheric pressure.

A center post 50 rises from the second piston. Its upper end 51 abuts, but is not rigidly connected to, the first face of the first piston. A peripheral sliding seal 51a is interposed between post 50 and a tubular flange 52 on the partition, thereby isolating first face 34 of the first piston from the second face 44 of the second piston.

A by-pass conduit 55 extends from region 56 between the first piston and the partition to region 57 between the body and the first face of the second piston. This conduitry includes cross-ports 58 connected to an axial passage 59 and a second set of cross-ports 60.

Shaft 21 has a peripheral sliding seal 61 which slides in cylindrical wall 62. It is important to notice clearance 63 between the shaft and wall 62, because it is this clearance which enables flow from region 56 to reach region 57 through the conduitry.

It will now be seen that identical pressure will exist in regions 56 and 57, which face the first faces of the two pistons. Thus, actuating pressure admitted at inlet port 65 pressurizes both first faces, and is in common opposition to atmospheric pressure and the spring bias.

The operation of this actuator is straight forward. It is shown in its rest, unactuated, condition. The bias spring presses the pistons together as a stack, forcing the valve member downward to close the valve being controlled by the actuator.

When pressurized fluid is introduced to the inlet port, its pressure is applied to the first face of the first piston. It also flows through the described conduitry and is applied to the first face of the second piston. The second face of both pistons are vented to atmosphere.

The combined forces on the two pistons move the pistons upward together, the bias spring assuring that they remain in abutting contact. Thus, for a given crosssection area exposed to actuating pressure, the envelope size can be smaller than if only one piston were used.

The actuator is elegantly simple. It will be appreciated that the illustrated actuator is a circular structure. Instead of sliding seals, bellows, or bellow fram seals could be provided, but O-rings suffice for most applications.

When the pressure is relieved at the inlet port, the bias spring will again move the stack downward.

The construction of this valve facilitates and simplifies its installation. Valves and actuators of this type are very often installed in complex arrangements. Anything which can reduce the number of bends in the plumbing, or facilitate the installation by enabling procedures to be completed in a more convenient manner are of considerable importance.

For example, many actuators whose inlet ports are at an end of the actuator provide a plurality of available ports at least to reduce the complexity of the task, but also providing complexity in manufacture and additional risk of leakage. The instant device provides a single inlet port 65 in the wall of the actuator. It can readily be located anywhere around the central axis merely by loosening coupler 25, rotating the actuator housing, and re-tightening the coupler. This greatly reduces the complexity of the actuator and enables optimally short and pipes of simple shape to be used.

Piston guide 36 provides two important advantages. The risk of cocking the top piston is real, and when it cocks, it might stick. These valves often handle very vicious fluids which must be carefully controlled. Certainly the shut-off function must be absolutely reliable. This guide provides assurance that the piston will remain in correct alignment.

Guide 36 can, if desired, be made to slide with the top piston. If it does, it can provide a visual indication of the position of the piston, which is at least potentially desirable.

This invention thereby provides a simple and effective linear actuator which can be made economically and relatively small for exertion of a given axial force.

This invention is not to be limited by the embodiment shown in the drawings and described in the description, which is given by way of example and not of limitation, but only in accordance with the scope of the appended claims.

I claim:

1. A linear actuator having an axis, said actuator comprising:
    a body having a peripheral sidewall, and inside said side wall, a first and second cylinder wall axially spaced apart and concentric on said axis;
    a coupler for releasably mounting said body to a next assembly, enabling the body, when the coupler is loosened, to be rotated around said axis;
    a partition between cylinder walls dividing them from one another;
    a first piston slidably and sealingly fitted in said first cylinder wall, said first piston having a first face and a second face;
    a second piston slidably and sealingly fitted in said second cylinder wall, said second piston having a first face and a second face;
    a partition providing a fluid sealing barrier between said first and second cylinder walls;
    vent ports means through said body venting said second faces to the atmosphere;
    force bias means exerting an axial bias force against said second face of first piston;
    inlet port means entering said body through said peripheral side wall for enabling supply of fluid under pressure to regions inside said cylinder walls, applied to said first faces of both pistons;
    abutment means on said pistons enabling said pistons to contact one another for transmission of bias force to hold them in abutment;
    one of said pistons including a post sealingly and slidingly fitted to said partition to pass therethrough, so as to accomplish said abutment of said pistons;
    said inlet port being a single port passing into one of said cylinder walls, and in which by-passing conduitry extends through said post between regions facing both of said first faces;
    and in which the uppermost of said pistons includes a central axially extending recess, and in which a guide pin is fixed to said body, projecting axially into said recess in a sliding close-fitting relationship to prevent the piston from cocking, and to serve as a limit stop for upward movement of said piston.

* * * * *